(12) United States Patent
Droux et al.

(10) Patent No.: US 6,405,525 B1
(45) Date of Patent: Jun. 18, 2002

(54) COMBINATION POWER PLANT WITH INJECTION DEVICE FOR INJECTING WATER INTO THE LIVE STEAM

(75) Inventors: Francois Droux, Turgi (CH); Jurgen Reinhard, Kussaberg (DE); Ursula Froehlich, Wettingen (CH); Peter Mueller, Huttikon (CH); Hansueli Krieg, Rekingen (SE)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/657,097

(22) Filed: Sep. 7, 2000

(30) Foreign Application Priority Data

Sep. 20, 1999 (DE) ......................................... 199 44 920

(51) Int. Cl.[7] ................................................. F02C 6/18
(52) U.S. Cl. ..................................... 60/39.182; 122/7 R
(58) Field of Search ........................... 60/39.182, 39.53; 122/7 R

(56) References Cited

U.S. PATENT DOCUMENTS 5,647,199 A    7/1997  Smith
5,799,481 A *  9/1998  Fetescu .................... 60/39.281
6,240,718 B1 * 6/2001  Fetescu .................... 60/39.281

FOREIGN PATENT DOCUMENTS

DE           1949219         4/1971

* cited by examiner

*Primary Examiner*—Louis J. Casaregola
(74) *Attorney, Agent, or Firm*—Burns, Doane, Swecker & Mathis, L.L.P.

(57) ABSTRACT

A combination power plant comprises at least one gas turbine system, a steam turbine, as well as a waste heat steam generator, where the hot waste gases of the gas turbine system flow through said waste heat steam generator and said waste heat steam generator generates steam within a water/steam cycle for operating the steam turbine, and said waste heat steam generator comprises at least one evaporator and a superheater that follows the evaporator, where said superheater delivers live steam via a live steam line to the steam turbine, whereby a first injection device for injecting water into the live steam is located in the live steam line, and where said injection device is supplied via a first supply line with injection water from a removal point in the water/steam cycle. In such a combination plant, breakage due to alternating stresses in the injection system is substantially avoided in that first means for preheating the injection water are located in the supply line of the first injection device a short distance from this injection device.

12 Claims, 2 Drawing Sheets

COMBINATION POWER PLANT WITH INJECTION DEVICE FOR INJECTING WATER INTO THE LIVE STEAM

FIELD OF THE INVENTION

This invention relates to the field of power plant technology. It concerns a combination power plant with an injection device for injecting water into the live steam according to the preamble of claim 1. Such a combination power plant is known, for example, from applicant's document DE-A1-195 45 668.

BACKGROUND OF THE INVENTION

Figure 1:
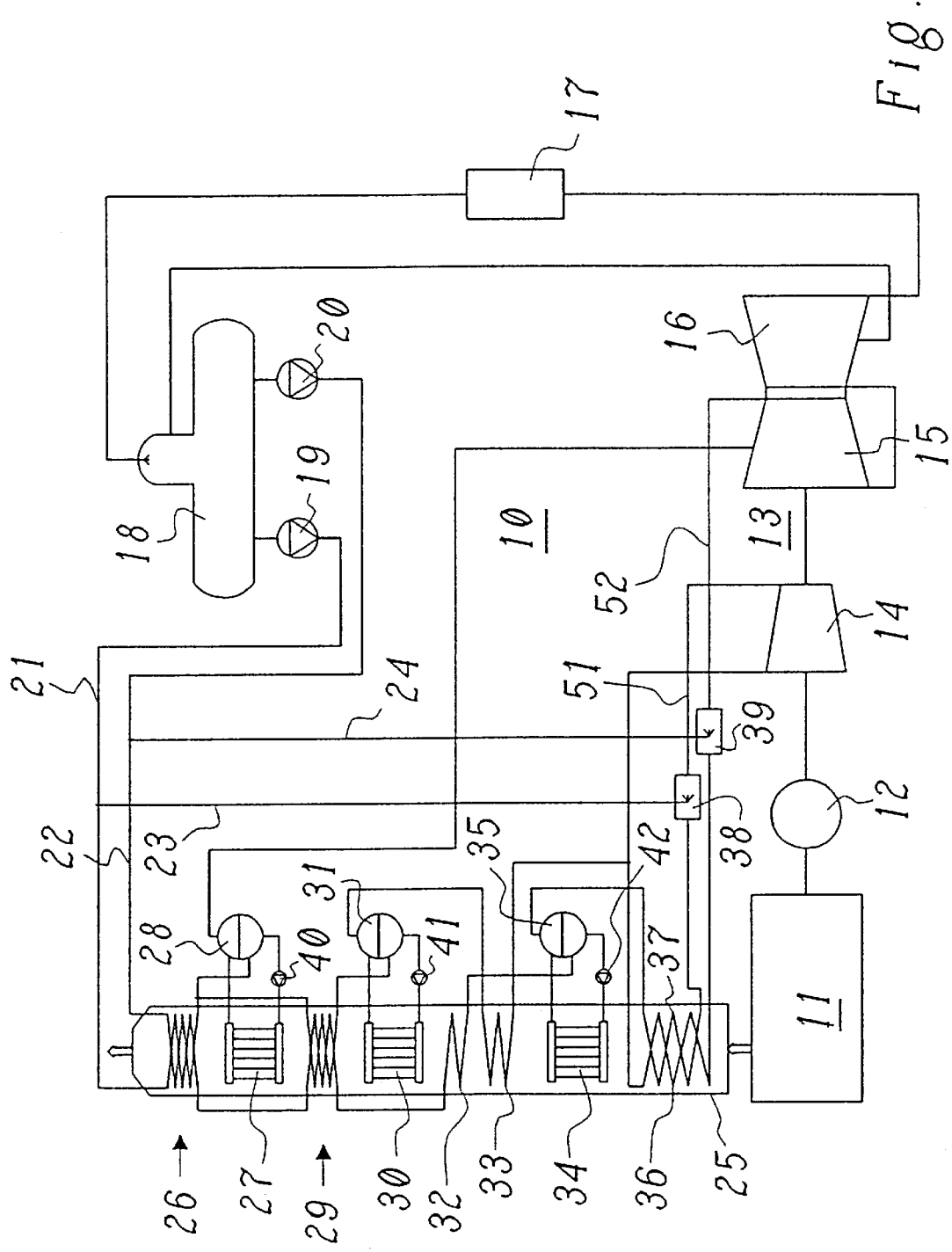

In combined gas/steam power plants or combination power plants in which the hot waste gases of one or more gas turbine(s) are used to generate steam in the water/steam cycle of one or more steam turbine(s), the steam temperature depends greatly on the load of the gas turbine(s) and the environmental conditions. In order to be able to flexibly adapt the steam temperature of the live steam to the requirements of the steam turbine(s), water—if necessary—is injected into the live steam, so that the temperature of the live steam may be reduced, more or less, as needed. The simplified schematic of such an (exemplary) combination power plant as currently used is shown in FIG. 1. The combination power plant 10 comprises a gas turbine system 11 (shown for simplicity's sake as a function block), a steam turbine 13 with high pressure stage 14, medium pressure stage 15, and low pressure stage 16, a waste heat steam generator 25 with various evaporation and heat exchanger devices, a feed water container 18, and a condensation device 17 (also shown only as a function block). In the example, the gas turbine system 11 and the steam turbine 13 drive a common generator 12. The waste heat steam generator 25 of the example comprises three evaporators, i.e. a low pressure evaporator 27, a medium pressure evaporator 30, and a high pressure evaporator 34. Each of the three evaporators 27, 30, 34 adjoins a corresponding steam drum, i.e. a low pressure steam drum 28, a medium pressure steam drum 31, and a high pressure steam drum 35, from which the condensate in each case is pumped by means of recirculation pumps 40, 41, and 42 to the adjoining evaporator. Hot waste gases that are discharged from the gas turbine system 11 (arrows in FIG. 1) flow through the waste heat steam generator 25 from the bottom to the top. At the cold, upper end of the waste heat steam generator 25, a low pressure preheating stage (low pressure economizer) 26 is provided. Between the evaporators 27 and 30 is a medium pressure preheating stage (medium pressure economizer) 29. A high pressure preheating stage (high pressure economizer) 32 is located between evaporators 30 and 34. Also located between evaporators 30 and 34 is a medium pressure superheater 33. And finally, at the hot, lower end of the waste heat steam generator 25, a high pressure superheater 37 and an intermediate superheater ("reheater") are provided. The internal construction of waste heat steam generator 25 is therefore similar to the one in U.S. Pat. No. 5,647,199. The function of the system according to FIG. 1 can be described as follows: Feed water is pumped from the feed water container 18 via one of two possible ways by a first feed water pump 19 through a first feed water line 21 to the waste heat steam generator 25, and is heated there consecutively in preheating stages 26, 29, and 32. The preheated feed water flows into the high pressure steam drum 35, and is evaporated in the connected high pressure evaporator 34. The resulting steam from high pressure steam drum 35 is superheated in the following superheater 37, and is fed as live steam via a live steam line 51 to the high pressure stage 14 of the steam turbine 13. After flowing through the high pressure stage 14, additional steam from the medium pressure steam drum 31 that has been superheated in the superheater 33 is added to this steam before it is reheated in the intermediate superheater 36, and it is then passed via a hot steam line 52 to the medium pressure stage 15. The medium pressure steam drum 31 is hereby supplied by a second feed water pump 20 via a second feed water line 22 with feed water that is preheated in the two preheating stages 26 and 29. The low pressure steam drum 28 is also supplied by the second feed water line 22 with feed water that is preheated in the first preheating stage 26. The steam from the low pressure steam drum 28 is supplied via the medium pressure steam line to the medium pressure stage 15 of the steam turbine 13. After the steam has consecutively passed through the medium pressure stage 15 and the low pressure stage 16, it is condensed in an condensation device 17, and the condensate pumped back into the feed water container 18. As previously mentioned, the temperature of the steam in the live steam line 51 and hot steam line 52 depends greatly on the discharge temperature of the gas turbine system 11. To make it possible that the steam temperature can be changed without intervening in the operation of the gas turbine system 11, injection devices 38 and 39 that can be used to inject water into the steam and thus to reduce the steam temperature have been provided in each of lines 51 and 52. The injection devices 38 and 39 receive their water via corresponding supply lines 23 and 24 from the feed water lines 21 and 22, in which the required injection pressure is already present due to the feed water pumps 19, 20.

During operation of the system, it may occur that—in order to improve the start-up behavior—the steam temperature is adjusted down in a controlled manner at certain time intervals by injecting water, while no water needs to be injected at other time intervals. This means that the injection devices 38, 39 are only required intermittently. This operation results in high loads due to alternating stresses within the injection devices 38, 39 installed in the hot steam stream. During injection operation they are brought to a temperature close to that of the injected water which, in order to have a sufficient initial pressure (see FIG. 1) is removed directly from the (approximately 60° C. cool) feed water. In contrast, the injection devices 38, 39 are brought to steam temperature between the periods of the injection operation, whereby said steam temperature can easily be above 500° C. and up to 600° C. in modern systems. These thermal and thermo-mechanical alternating stresses can result in premature breakage of components of the injection devices. In principle, the situation could be somewhat improved if preheated water were removed for injection from the preheating stages 26, 29, 32 of the waste heat steam generator 25. But with this procedure, the water in supply lines 23, 24 also remains cold in most cases until it reaches injection devices 38, 39, since the lines are not located within the warm waste gas stream. This means that at the beginning of the injection process, first cold water flows through the injection devices 38, 39 and results in thermal stresses. Although the extent and duration of these stresses are limited, they are large enough to pose a serious risk of breakage.

DESCRIPTION OF THE INVENTION

It is therefore the objective of the invention to modify a combination power plant of the above-mentioned type in such a way that the described disadvantages are avoided, and, in particular, so that the thermal stresses in the injection device(s) are reduced to such an extent that breakage due to alternating stresses can be largely avoided. This objective is realized with the entirety of the characteristics of claim 1. The core of the invention is that the mechanical stresses induced by temperature differences are reduced to a harmless level by preheating the injection water or maintaining its temperature up to a short distance from the injection devices or injection nozzles. A first preferred embodiment of this combination power plant according to the invention is characterized in that the steam turbine comprises a high pressure stage and a medium pressure stage, that the live steam line is connected with the inlet of the high pressure stage, that the outlet of the high pressure stage is connected with an intermediate superheater located in the waste heat steam generator, said intermediate superheater reheating the steam from the high pressure stage and delivering it via a hot steam line to the medium pressure stage, that a second injection device for injecting water into the hot steam is located in the hot steam line, said injection device being supplied via a second supply line with injection water from a removal point in the water/steam cycle, and that in the second supply line of the second injection device second means for preheating the injection water are located a short distance before the injection device. This makes it possible to use the advantages of the invention also for systems with intermediate superheating. The preheating can be accomplished in a particularly effective manner if, according to another preferred embodiment of the invention, the first or second means each comprise a condenser that is connected via a tap line to a steam-carrying line of the water/steam cycle and through which the injection water flows. Such a leakage steam condenser has the advantage of maintaining the heat or preheating, which results in practically no losses. Only during the injection process does a slightly larger amount of steam flow as a result of the condensate that accrues in a higher amount. The preheating causes a higher injection amount, which, however, results in a higher performance of the steam turbine, so that this loss is substantially compensated for again. In place of the condenser, a gas/gas heat exchanger, water/gas heat exchanger, or electric heater can be used as a heating device within the framework of the invention. In principle, the condensers can be connected on the steam side to any of the steam-carrying lines. It is possible, but not mandatory, to place the connection on the same line. The pressure level determines the possible preheating temperature and thus the criteria for the selection of the adequate steam system.In an exemplary embodiment particularly advantageous the condenser of the first means is connected via its tap line to the live steam line or if the condenser of the second means is connected via its tap line to the hot steam line. In an exemplary embodiment, heat steam generator comprises a low pressure evaporator, medium pressure evaporator, and high pressure evaporator, which adjoin a low pressure steam drum, a medium pressure steam drum, and a high pressure steam drum, respectively, and the condensate of the first condenser is fed to the medium pressure steam drum or the condensate of the second condenser is fed to the low pressure steam drum, and the first or second condenser adjoins a condensomat in order to regulate the fluid level in the condenser. The preheating device is therefore practically self-regulating and permits a preheating temperature near the saturation temperature of the heating medium. The size of the leakage condenser and condensomat hereby depends on the maximum injection amount of the respective injection device. Further embodiments can be derived from the secondary claims.

Figure 2:
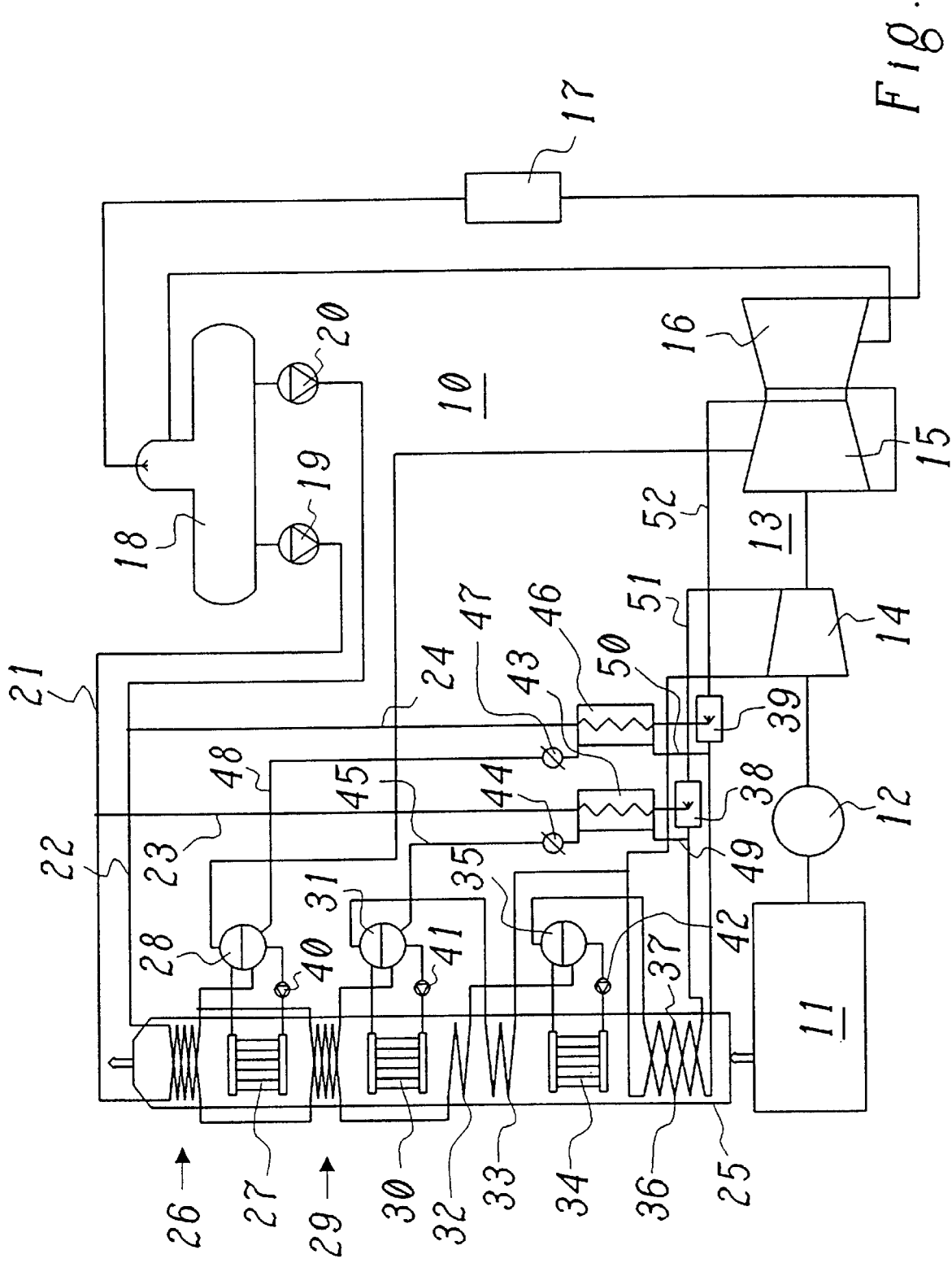

BRIEF EXPLANATION OF DRAWINGS (A) Preferred embodiment/s of the invention is/are disclosed in the following description and illustrated in the accompanying drawings, in which:

FIG. 1 shows a simplified schematic of a combination system with injection devices according to the state of the art, and FIG. 2 shows a schematic comparable to FIG. 1, with a preheating of the injection water according to a preferred exemplary embodiment of the invention.

DETAILED DESCRIPTION OF THE INVENTION

The combination power plant 10' shown in FIG. 2, which comprises a preheating of the injection water according to a preferred embodiment of the invention, has the same basic construction as the combination power plant 10 shown in FIG. 1. Identical system parts therefore have been designated with identical reference numbers in the two figures. Details of the system, such as, for example, control valves, return valves, bypasses, etc. have been eliminated for the sake of clarity. For the purpose of the preheating according to the invention, the supply lines 23 and 24 to the injection devices 38 and 39 have been provided with condensers 43 and 46 at a short distance from these injection devices, where said condensers are constructed as leakage steam condensers. Steam is discharged through condensers 43, 46 after having been removed via corresponding tap lines 49 or 50 from the live steam line 51 or the hot steam line 52. The steam condenses while heating the injection water flowing through the condenser, and the condensate is returned via a return line 45 or 48 into the medium pressure steam drum 31 or low pressure steam drum 28, respectively. It would also be conceivable, however, that, for example, both return lines 45, 48 lead to the low pressure steam drum 28. The condensers 43 and 46 are each hereby provided with a so-called condensomat 44 or 47. This condensomat regulates the fluid level of the condensate accumulating in the condenser. If this level exceeds a predetermined upper level, the condensate is discharged into the respective return line. If, however, the level falls below a lower limit, the discharge process is stopped until the upper limit is again reached. The preheating device constructed in this manner is to all practical purposes self-regulating and makes a preheating temperature near the saturation temperature of the steam heating medium possible. The two condensers 43 and 46 respectively enclose the supply lines 23 and 24 a short distance from the injection devices 43 or 46. This makes it possible to maintain the injection water heat with almost no losses. As was mentioned above, a slightly increased amount of steam flows only during the actual injection process as a result of the greater amount of accumulated condensate that is removed through the respective condensomat. The higher injection amount, caused by the preheating, results in a greater performance of the steam turbine, which substantially compensates for this loss. The connection of condensers 43, 46 on the steam side also may take place at other places of the steam network than shown in FIG. 2. The pressure level determines the possible preheating temperature and is therefore the criterion for the selection of the tapping point. The size of the condensers and condensomats depends on the maximum required injection amount. Overall, the invention provides a significant improvement in the operating safety of the injection devices and therefore of the entire combination system.

What is claimed is:

1. Combination power plant comprising at least one gas turbine system, a steam turbine, a waste heat steam generator where the hot waste gases of the gas turbine system flow through said waste heat steam generator and said waste heat steam generator generates steam for operating the steam turbine within a water/steam cycle, and said waste heat steam generator comprises at least one evaporator and a superheater that follows the at least one evaporator, where said superheater delivers live steam by a live steam line to the steam turbine, a first injection device for injecting water into the live steam is located in the live steam line, and where said injection device is supplied by a first supply line with injection water from a removal point in the water/steam cycle, wherein first means for preheating the injection water are provided in the supply line of the first injection device a short distance from this injection device.

2. Combination power plant as claimed in claim 1, wherein the steam turbine comprises a high pressure stage and a medium pressure stage, the live steam line being connected with the inlet of the high pressure stage, the outlet of the high pressure stage being connected with an intermediate superheater located in the waste heat steam generator, said intermediate superheater reheating the steam from the high pressure stage and delivering it by a hot steam line to the medium pressure stage, a second injection device for injecting water into the hot steam being located in the hot steam line, said second injection device being supplied by a second supply line with injection water from a removal point in the water/steam cycle, and in the second supply line of the second injection device, second means for preheating the injection water are located a short distance before the injection device.

3. Combination power plant as claimed in claim 2, wherein the first or second means each comprise a heating device, in particular a condenser or gas/gas heat exchanger or water/gas heat exchanger or an electric heater.

4. Combination power plant as claimed in claim 3, wherein the first or second means each comprise a condenser connected by a tap line with a steam line of the water/steam cycle and through which condenser the injection water flows.

5. Combination power plant as claimed in claim 4, wherein the condenser of the first means is connected by its tap line with the live steam line.

6. Combination power plant as claimed in claim 4, wherein the condenser of the second means is connected by the second means tap line with the hot steam line.

7. Combination power plant as claimed in claim 3, adjoins at least one steam drum that is connected with at least one condenser and that the condensate from the first or second least one steam drum.

8. Combination power plant as claimed in claim 7, wherein the waste heat steam generator comprises a low pressure evaporator, a medium pressure evaporator, and a high pressure evaporator, which adjoin a low pressure steam drum, a medium pressure steam drum, and a high pressure steam drum, respectively, and that the condensate of the first condenser is fed to the high pressure steam drum or medium pressure steam drum or the low pressure steam drum or the feed water container, or that the condensate of the second condenser is fed to the high pressure steam drum or medium pressure steam drum or low pressure steam drum or feed water container.

9. Combination power plant as claimed in claim 3, wherein the first or second condenser adjoins means for regulating the fluid level in the condenser.

10. A combustion power plant, comprising:
at least one gas turbine system;
a steam turbine;
a waste heat steam generator generates steam for operating the steam turbine within a water/steam cycle;
at least one evaporator within the waste heat steam generator;
and a superheater that corresponds with the at least one evaporator, the superheater delivers live steam by a live steam line to the steam turbine;
a first injection device located in the live steam line; and
wherein first means for preheating injection water are provided in the supply line of the first injection device.

11. The combustion power plant of claim 10, wherein the injection device is supplied by a first supply line with injection water from a removal point in the water steam/ cycle.

12. The combustion power plant of claim 10, wherein a second injection device for injecting water into hot steam is located in a hot steam line.

* * * * *